(12) United States Patent
Zhou et al.

(10) Patent No.: US 11,009,239 B2
(45) Date of Patent: May 18, 2021

(54) FRESH AIR DEHUMIDIFICATION DEVICE AND PACKAGED TERMINAL AIR CONDITIONER USING SAME

(71) Applicant: GUANGDONG CHIGO HEATING AND VENTILATION EQUIPMENT CO., LTD., Foshan (CN)

(72) Inventors: Ming Zhou, Foshan (CN); Huandi Yang, Foshan (CN)

(73) Assignee: GUANGDONG CHIGO HEATING AND VENTILATION EQUIPMENT CO., LTD., Foshan (CN)

(*) Notice: Subject to any disclaimer, the term of this patent is extended or adjusted under 35 U.S.C. 154(b) by 183 days.

(21) Appl. No.: 16/215,680

(22) Filed: Dec. 11, 2018

(65) Prior Publication Data
US 2019/0203954 A1    Jul. 4, 2019

Related U.S. Application Data

(63) Continuation of application No. PCT/CN2018/092726, filed on Jun. 26, 2018.

(30) Foreign Application Priority Data

Dec. 25, 2017   (CN) .......................... 201721854979.4

(51) Int. Cl.
*F24F 1/022*   (2019.01)
*F24F 1/0358*   (2019.01)
(Continued)

(52) U.S. Cl.
CPC ............ *F24F 1/0358* (2019.02); *F24F 1/022* (2013.01); *F24F 1/0323* (2019.02);
(Continued)

(58) Field of Classification Search
CPC ....... F24F 1/0358; F24F 3/1405; F24F 12/001
(Continued)

(56) References Cited

U.S. PATENT DOCUMENTS 2,142,289 A * 1/1939 Sloan ........................ F24F 6/06
261/130
2,203,685 A * 6/1940 Kaufman .............. F24F 5/0017
62/93
(Continued)

FOREIGN PATENT DOCUMENTS

| CN | 103851708 A | 6/2014 |
| CN | 203704166 U | 7/2014 |

(Continued)

OTHER PUBLICATIONS

Xiangjun Yang, the International Searching Authority written comments, dated Sep. 2018, CN.

*Primary Examiner* — Filip Zec

(57) ABSTRACT

A fresh air dehumidification device of a PTAC includes a cross-flow fan, a main evaporator, an air supply channel communicated with the cross-flow fan via the main evaporator, and an air exhausting device formed in the air supply channel for supplying air to the main evaporator. The air inlet of the air supply channel is connected to outdoor and the air outlet of the air supply channel is formed on a first air intake of the main evaporator. Fresh air passing through the air supply channel and the air exhausting device and is dehumidified by the main evaporator and then flows into the indoor so that the main evaporator of a PTAC is used as a dehumidifier in the dehumidification process, but without needing to increase a separate dehumidification system. So, the structure of the present disclosure can reduce the manufacturing cost of the PTAC.

15 Claims, 11 Drawing Sheets

(51) Int. Cl.
*F24F 1/0323* (2019.01)
*F24F 3/14* (2006.01)
*F24F 12/00* (2006.01)
*F24F 1/035* (2019.01)

(52) U.S. Cl.
CPC .......... F24F 3/1405 (2013.01); F24F 12/001 (2013.01); *F24F 1/035* (2019.02)

(58) Field of Classification Search
USPC ........................................ 62/238.7, 159, 160
See application file for complete search history.

(56) References Cited

U.S. PATENT DOCUMENTS

| | | | | |
|---|---|---|---|---|
| 7,849,709 | B2* | 12/2010 | Takada | F24F 1/0057 62/426 |
| 9,521,783 | B2* | 12/2016 | Leckelt | H05K 7/20745 |
| 10,012,398 | B2* | 7/2018 | Swanson | F24F 11/30 |
| 10,041,737 | B2* | 8/2018 | Seccuro | F25D 17/067 |
| 10,352,575 | B2* | 7/2019 | Dingle | F24F 3/1405 |
| 10,473,355 | B2* | 11/2019 | O'Brien | F24F 12/006 |
| 2010/0275630 | A1* | 11/2010 | DeMonte | F24F 1/04 62/272 |
| 2011/0079024 | A1* | 4/2011 | Hakbijl | F24F 12/003 62/56 |
| 2013/0048267 | A1* | 2/2013 | Koretomo | F24F 11/81 165/300 |
| 2014/0190037 | A1* | 7/2014 | Erb | F24F 3/147 34/474 |
| 2018/0328603 | A1* | 11/2018 | Lee | F24F 11/0008 |

FOREIGN PATENT DOCUMENTS

| | | |
|---|---|---|
| CN | 104279637 A | 1/2015 |
| CN | 204693666 U | 10/2015 |
| CN | 105371386 A | 3/2016 |
| CN | 106352418 A | 1/2017 |
| CN | 106931533 A | 7/2017 |
| CN | 207299225 U | 5/2018 |
| JP | 5511560 B2 | 6/2014 |

* cited by examiner

FRESH AIR DEHUMIDIFICATION DEVICE AND PACKAGED TERMINAL AIR CONDITIONER USING SAME

CROSS-REFERENCE TO RELATED APPLICATION

The present application is a continuation-application of International Application PCT/CN2018/092726, with an international filing date of Jun. 26, 2018, which claims foreign priority of Chinese Patent Application No. 201710288797.3, filed on Apr. 27, 2017, and Chinese Patent Application No. 201721854979.4, filed on Dec. 25, 2017 in the State Intellectual Property Office of China, the contents of all of which are hereby incorporated by reference the contents of all of which are hereby incorporated by reference.

BACKGROUND

1. Technical Field

The present disclosure generally relates to air conditioners field, and especially relates to a fresh air dehumidification device and a packaged terminal air conditioner using same.

2. Description of Related Art

A packaged terminal air conditioner (PTAC) is a type of self-contained heating and air conditioning system widely used in bedrooms, offices and other places due to its low price, small size, low installation requirements and energy-saving and power-saving advantages. In general, a conventional fresh air dehumidification device of the PTAC is configured to dehumidify fresh air from outdoor and then convey the fresh air into indoor.

Referring to FIG. 1, a conventional fresh air device includes an independent dehumidification system, a middle partition 01, an air duct plate 02, a cross-flow fan 03 and a main evaporator 04. The independent dehumidification system includes a fan 05, a dehumidifying evaporator 06, a dehumidifying condenser 07 and a dehumidifying compressor 08. The air duct plate 02 is formed between the middle partition 01 and the cross-flow fan 03. The middle partition 01 includes a first air inlet, the air duct plate 02 includes a second air inlet, and an air supply channel is formed between the first air inlet and the second inlet to connect with the cross-flow fan 03. The fan 05 of the independent dehumidification system, the dehumidifying evaporator 06 and the dehumidifying condenser 07 all are received in the air supply channel in turn. When the independent dehumidification system is working, the fresh air entering from the outdoor first passes through the independent dehumidification system. And then, under negative pressure of the fresh air which is generated by operating the cross-flow fan 03, the air in the air supply channel formed between the first air inlet and the second air inlet will directly transfer to the cross-flow fan 03, finally it is blown out via the cross-flow fan 03.

However, the independent dehumidification system must set in the conventional PTAC for dehumidifying the air so that not only the overall volume of the PTAC is increased, but also the manufacturing cost is also increased.

Therefore, a new PTAC with a dehumidification function and a low manufacturing cost is desired.

SUMMARY

The technical problems to be solved: in view of the shortcomings of the related art, the present disclosure relates to a fresh air dehumidification device and a packaged terminal air conditioner using same which can minimize the manufacturing cost of the packaged terminal air conditioner.

The technical solution adopted for solving technical problems of the present disclosure is:

a fresh air dehumidification device includes a cross-flow fan, a main evaporator, an air supply channel communicated with the cross-flow fan via the main evaporator, and an air exhausting device formed in the air supply channel for supplying air to the main evaporator. The air inlet of the air supply channel is connected to outdoor and the air outlet of the air supply channel is formed on a first air intake of the main evaporator.

Wherein the fresh air dehumidification device further includes an air duct plate, which is a sealing plate, and a middle partition which includes an installing member for positioning the air exhausting device thereon.

Wherein the middle partition includes an installing hole and a pair of installing members, the pair of installing members is respectively installed in an upper portion and an opposite lower portion of the installing hole to respectively connect with two ends of the air exhausting device.

Wherein the fresh air dehumidification device further includes a member set on a second air intake of the fan.

Wherein member includes at least one of an air filtering device installed in the air supply channel for filtering the outdoor air, and a shielding, an air door and a driving device for driving the air door to open and close, the fan is received in the shielding and a main air intake of the shielding is the air inlet of the air supply channel and directly opposite to the fan.

Wherein the member further comprises a door frame on which both the air door and the air filtering device are installed, the air door rototably connected with the door frame, along a movement direction of air flow, the air door located at the back of the air filtering device and the door frame installed in the shielding.

Wherein a rotating shaft is arranged on a side of the air door through which the air door is connected with the door frame, and the air door can be driven by the driving device to rotate around the rotating shaft to open and close.

Wherein the member further includes a supporting plate formed on a top end of the door frame and a swinging rod connected to the air door, and the driving device is a hysteretic-motor fixed on the upper of the supporting plate for driving the swinging rod to move, with a main shaft of the hysteretic-motor extending downward through the supporting plate to connect with the swinging rod.

Wherein a convex shaft is formed on the air door and parallel to the rotating shaft, one end of the swinging rod is connected with the main shaft of the hysteretic-motor and the other end of the swinging rod comprises a slot so that the swinging rod is connected with the convex shaft through the slot for providing a freedom degree of rotatably driving the air door.

Wherein an elastic reset member is connected between the air door and the door frame to automatically close and reset the air door after it is opened.

Wherein the elastic reset member is a torsion spring sleeved around the rotating shaft, a pair of torsion beams formed at two opposite ends of the torsion spring is respectively jacked on a rim of the air door and the door frame so that the air door has a movement trend to automatically close toward a side of the door frame.

Wherein an elastic cushion pad is formed on both inner and outer edges of the rim of the air door.

Wherein the air filtering device is a filter grill and the door frame includes a filter frame for installing the filter grill.

Wherein the filter frame is detachably connected with the filter grill, and the filter frame includes a supporting post including a recess for clamping with the filter grill.

Wherein the shielding includes a bottom plate and a channel plate, with a L-shaped configuration and a bottom portion thereof connecting with the bottom plate, the door frame is installed on the bottom plate and the channel plate; a bottom end of a side plate of the channel plate connected with the bottom plate and an upper cover thereof positioned above the bottom plate, when opening the air door, an end of the air door is rotated towards a direction far away from the side plate of the channel plate so that an air intake duct of an outdoor fan is blocked by the air door; while when closing the air door, the air inlet of the air supply channel is communicated with the air intake duct of the outdoor fan.

Wherein the air door is received in the shielding, when the air door is in an open state, the end of the air door is rotated away from the air exhausting device and a side portion of the air door is flushed with the main air intake of the shielding.

Wherein the driving device comprises a servo motor and a switch for controlling activation of the servo motor, the member further comprises a limiting portion for limiting the position of the air door, the switch controls the servo motor to stop working when the limiting portion is resisted against the air door.

A packaged terminal air conditioner according to an exemplary embodiment of the present disclosure includes a fresh air dehumidification device, the fresh air dehumidification device including: a cross-flow fan, a main evaporator, an air supply channel communicated with the cross-flow fan via the main evaporator, a fan formed in the air supply channel and communicated with the main evaporator via the air supply channel for directly supplying outdoor air to the main evaporator, a member set on a second air intake of the fan, an air duct plate and a middle partition comprising a supporting member for positioning the fan thereon; and wherein the air duct plate is a sealing plate, an air inlet of the air supply channel is connected to the outdoor air and an air outlet of the air supply channel is formed on a first air intake of the main evaporator.

Wherein the member includes at least one of an air filtering device installed in the air supply channel for filtering the outdoor air, a door frame, and a shielding, an air door and a hysteretic-motor for driving the air door to open and close, the fan is received in the shielding and a main air intake of the shielding is the air inlet of the air supply channel and directly opposite to the fan; the air door rototably connected with the door frame, along a movement direction of air flow, the air door located at the back of the air filtering device and the door frame installed in the shielding; the door frame on which both the air door and the air filtering device are installed, and a rotating shaft is arranged on a side of the air door through which the air door is connected with the door frame, the air door is driven by the hysteretic-motor to rotate around the rotation shaft to open and close.

Wherein the shielding includes a bottom plate and a channel plate, with a L-shaped configuration and a bottom portion thereof connecting with the bottom plate, the door frame is installed on the bottom plate and the channel plate; a bottom end of a side plate of the channel plate connected with the bottom plate and an upper cover thereof positioned above the bottom plate, when opening the air door, an end of the air door is rotated towards a direction far away from the side plate of the channel plate so that an air intake duct of an outdoor fan is blocked by the air door; while when closing the air door, the air inlet of the air supply channel is communicated with the air intake duct of the outdoor fan; the air door is received in the shielding; and when the air door is in an open state, the end of the air door is rotated away from the air exhausting device and a side portion of the air door is flushed with the main air intake of the shielding.

The present disclosure provides the advantages as below.

The fresh air dehumidification device used on a PTAC of the present disclosure includes a cross-flow fan, a main evaporator, an air supply channel communicated with the cross-flow fan via the main evaporator, and an air exhausting device formed in the air supply channel for supplying air to the main evaporator. The air inlet of the air supply channel is connected to the outside and the air outlet of the air supply channel is formed on a first air intake of the main evaporator. When it is required to supply air into the indoor, the PTAC is operated to work, fresh air from the outdoor passes through the air supply channel via the air exhausting device and then flows into the main evaporator to be dehumidified, finally flows into the indoor.

According to the above description, the fresh air dehumidification device of the present disclosure which can make fresh air passing through the air exhausting device and the air supply channel and is dehumidified by the main evaporator and then flow into the indoor so that the main evaporator of a PTAC can be used as a dehumidifier in its dehumidification process, but without needing to increase an independent dehumidification system, which can minimize the manufacturing cost of the PTAC.

BRIEF DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

Figure 1:
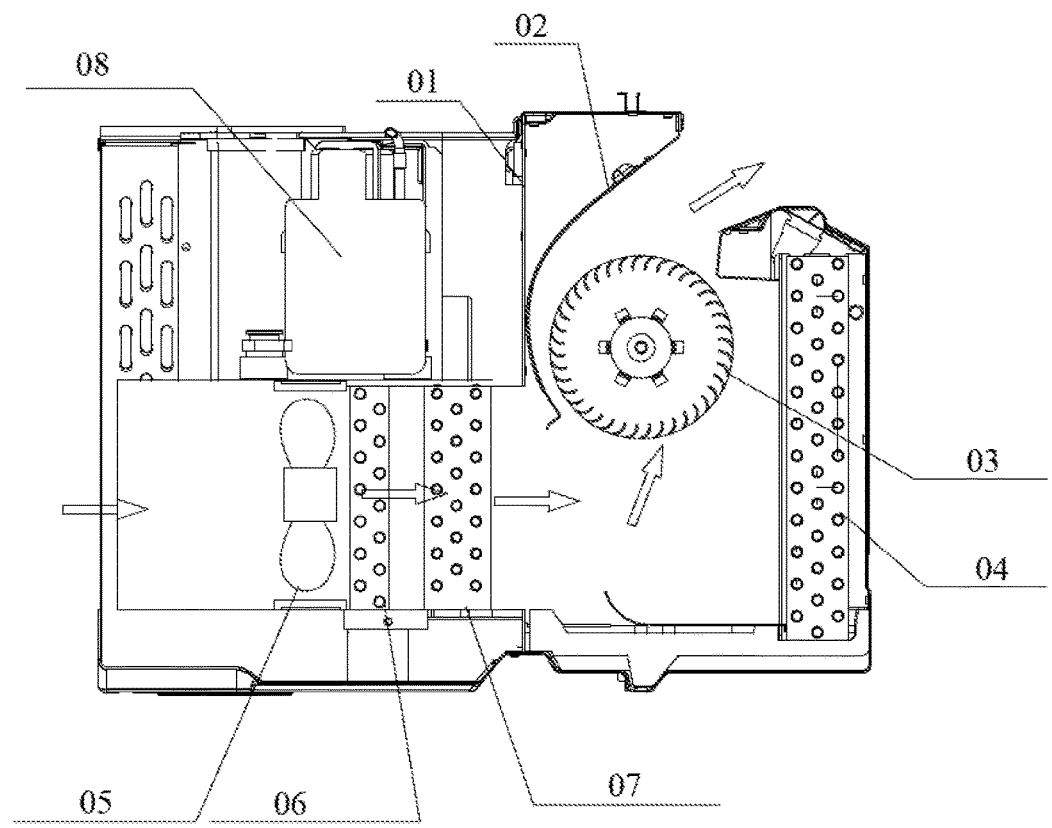
FIG. 1 is a schematic view of a conventional fresh air dehumidification device.
Figure 2:
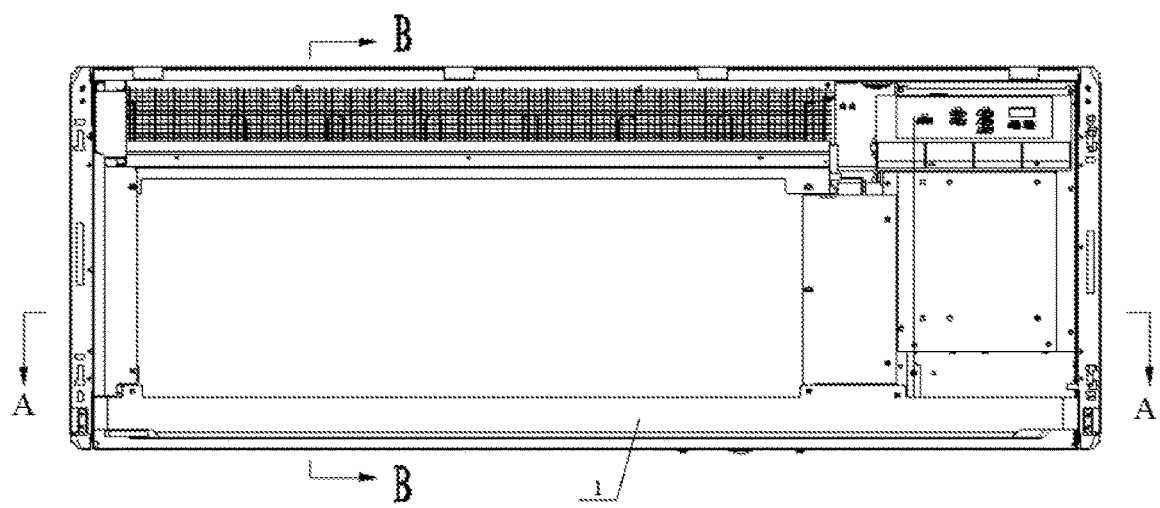
FIG. 2 is a schematic view of the fresh air dehumidification device in accordance with an exemplary embodiment.

The element labels according to the exemplary embodiment of the present disclosure shown as below:

main evaporator 1, 04, first air intake 1a, cross-flow fan 2, 03, air duct plate 3, 02, middle partition 4, 01, installing member 40, installing hole 41, upper portion 41a, lower portion 41b; fan 05, dehumidifying evaporator 06, dehumidifying condenser 07, dehumidifying compressor 08, fan 5, second air intake 5a, air supply channel 6, air inlet 6a, air outlet 6b, driving device 7, main shaft 7a, servo motor 70, switch 71, air filtering device 8, member 9, limiting portion 9a, shielding 91, main air intake 91a, air door 92, end 92a, side portion 92b, rim 920, elastic cushion pad 920a, air door gate 93, bottom plate 94, door frame 95, top end 95a, swinging rod 96, slot 96a, filter frame 97, supporting post 98, recess 98a, channel plate 99, bottom portion 99a, bottom end of side plate 99b, upper cover 99c, main baffle 10, rotating shaft 11, supporting plate 12, convex shaft 13, torsion spring 14, torsion beam 14a.

DETAILED DESCRIPTION

The most important fact of the present disclosure is to provide a fresh air dehumidification device and a PTAC using same to minimize the manufacturing cost thereof.

The disclosure is illustrated by way of example and not by way of limitation in the figures of the accompanying drawings, in which like reference numerals indicate similar elements.

Referring to FIGS. 2-6, in an exemplary embodiment of the present disclosure, the fresh air dehumidification device of a PTAC includes a cross-flow fan 2, a main evaporator 1, an air supply channel 6 communicated with the cross-flow fan 2 via the main evaporator 1, and an air exhausting device 5 formed in the air supply channel 6 for supplying air to the main evaporator 1. That is, the air exhausting device 5 is communicated with the main evaporator 1 via the air supply channel 6. The air inlet 6a of the air supply channel 6 is connected to outdoor and the air outlet 6b of the air supply channel 6 is formed on a first air intake 1a of the main evaporator 1. It can be understood that the position of the air inlet 6a of the air supply channel 6 can be determined according to the position relation of each element set in the PTAC. In order to save space, it is preferred that the air supply channel 6 is located at the bottom end of the PTAC. Specifically, the air exhausting device 5 can be a fan.

When it is required to supply air into the indoor, the PTAC is operated to work, fresh air from the outdoor passes through the air supply channel 6 via the air exhausting device 5 and then flows into the main evaporator 1 to be dehumidified, finally flows into the indoor.

Furthermore, the fresh air dehumidification device further includes an air duct plate 3 and a middle partition 4 which includes an installing member 40 for positioning the air exhausting device 5 thereon. Specifically, the installing member 40 is a supporting member formed on the bottom of the air exhausting device 5. By setting up the supporting member, it is convenient for workers to install the air exhausting device 5 in the middle partition 4 to avoid an extra space occupied by the air exhausting device 5. The air duct plate 3 is a sealing plate, that is, the air duct plate 3 is an integral configuration for preventing the outdoor air from directly entering the cross-flow fan 2. A main baffle 10 can be provided to enclose an initial opening of the air duct plate 3 in order to improve its sealability.

Preferably, the middle partition 4 includes an installing hole 41 and a pair of installing members 40, the pair of installing members 40 is respectively installed in an upper portion 41a and an opposite lower portion 41b of the installing hole 41 to respectively connect with two ends of the air exhausting device 5. Specifically, the installing member 40 can be installed on the middle partition 4 by bonding, welding, or threaded connection. The installation stability of the air exhausting device 5 is improved by setting a pair of installing members. In order to avoid waste of existing materials, the air exhausting device 5 can be installed at the first air inlet of a conventional middle partition. In the present disclosure, the installing hole 41 is equivalent to the conventional first air inlet.

Furthermore, the fresh air dehumidification device further includes a member 9 set on a second air intake 5a of the fan 5. Specifically, the member 9 can be a protection frame arranged at the outer end of the fan 5. Preferably, the member 9 includes a shielding 91, an air door 92 and a driving device 7 for driving the air door 92 to open and close. The fan 5 is received in the shielding 91 and a main air intake 91a of the shielding 91 is the air inlet 6a of the air supply channel 6. Preferably, the fan 5 is directly opposite to the main air intake 91a. For convenience of opening and closing the air door 92, the shielding 91 preferably includes a door bracket for installing the air door 92. Specifically, the member 9 further includes a swinging rod 96 connected to the air door 92, and the driving device 7 is a hysteretic-motor for driving the swinging rod 96 to move. Of course, the driving device 7 can also include a servo motor 70 and a switch 71 for controlling activation of the servo motor 70. The servo motor 70 can drive the air door 92 to open and close through the swinging rod 96.

Specifically, the member 9 includes an air filtering device 8 installed in the air supply channel 6 for filtering the outdoor air. It can be understood that the air filtering device 8 can be a filter core for filtering the air so that the indoor environment and the fresh air device can be less polluted by the air with impurities to further improve the span-life of the fresh air device.

Preferably, the member 9 further includes a door frame 95 on which both the air door 92 and the air filtering device 8 are installed. The air door 92 is rototably connected with the door frame 95, and along a movement direction of air flow, the air door 92 is located at the back of the air filtering device 8 and the door frame 95 is installed in the shielding 91, thereby an easy installation of the air door 92 and the air filtering device 8 can be obtained.

Preferably, a rotating shaft 11 is arranged on a side of the air door 92 through which the air door 92 is connected with the door frame 95. The air door 92 can be driven by the driving device 7 to rotate around the rotating shaft 11 to open and close. In this way, a controllable automatic opening and closing of the air door 92 can be achieved.

Preferably, the member 9 further includes a supporting plate 12 formed on a top end 95a of the door frame 95 and the driving device 7 is the hysteretic-motor fixed on the upper of the supporting plate 12 for driving the swinging rod 96 to move, with a main shaft 7a of the hysteretic-motor 7 extending downward through the supporting plate 12 to connect with the swinging rod 96. The swinging rod 96 is connected to the air door 92.

Preferably, a convex shaft 13 is formed on the air door 92 and parallel to the rotating shaft 11, one end of the swinging rod 96 is connected with the main shaft 7a of the hysteretic-motor 7 and the other end of the swinging rod 96 includes a slot 96a so that the swinging rod 96 is connected with the convex shaft 13 through the slot 96a for providing a freedom degree of rotatably driving the air door 92. The swinging rod 96 is directly driven by the hysteretic-motor 7 to rotate and then the convex shaft 13 is driven to follow rotating so that the air door 92 can rotate around the rotating shaft 11 to obtain a stable opening and closing of the air door 92.

In an exemplary embodiment of the present disclosure, the hysteretic-motor 7 is installed above the supporting plate 12, where the supporting plate 12 is higher than the door frame 95 and the air door 92, and the main shaft 7a of the hysteretic-motor 7 extends downward through the supporting plate 12 to connect with the swinging rod 96 to obtain a simple structure to easy to assemble and maintain, and suitable to the setting position of the air door 92.

Preferably, an elastic reset member is connected between the air door 92 and the door frame 95 to automatically close and reset the air door 92 after it is opened.

Preferably, the elastic reset member is a torsion spring 14 sleeved around the rotating shaft 11, a pair of torsion beams 14a formed at two opposite ends of the torsion spring 14 is respectively jacked on a rim 920 of the air door 92 and the door frame 95 so that the air door 92 has a movement trend to automatically close towards a side of the door frame 95.

Preferably, an elastic cushion pad 920a is formed on both inner and outer edges of the rim 920 of the air door 92. In this way, the problem of surface breakage and structure corrosion can be prevented when the air door 92 hits the inside of the door frame 95 or the outside of the shielding 91.

Preferably, the air filtering device 8 is a filter grill and the door frame 95 includes a filter frame 97 for installing the filter grill 8. The filter frame 97 is detachably connected with the filter grill 8, and the filter frame 97 includes a supporting post 98 including a recess 98a for clamping with the filter grill 8. Thus, the filter grill 8 is removed and cleaned in time to facilitate the air passing therethrough.

Figure 3:
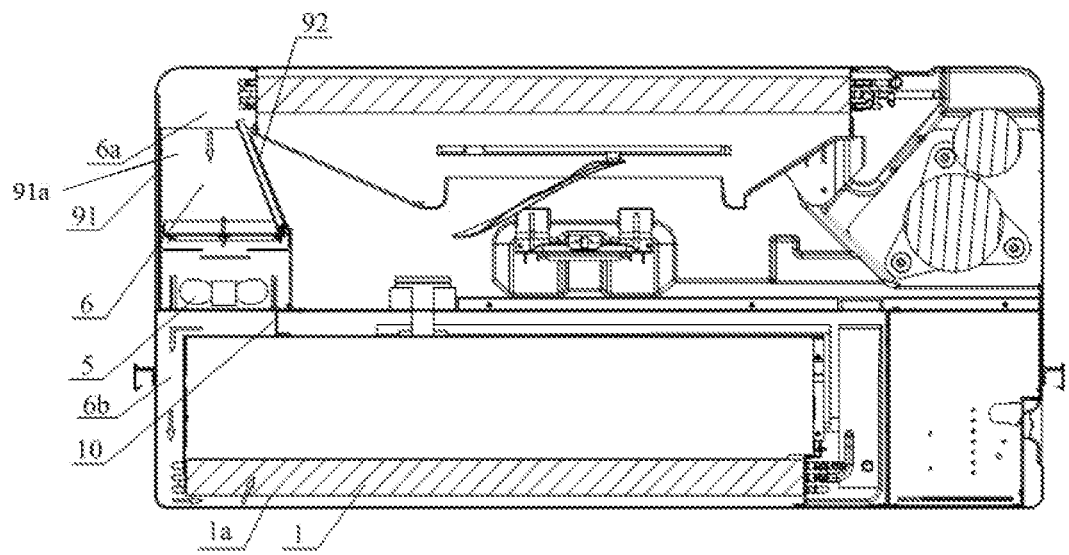
FIG. 3 is a cross-sectional view of the fresh air dehumidification device along line A-A of FIG. 2, shown an air door in its open state.
Figure 4:
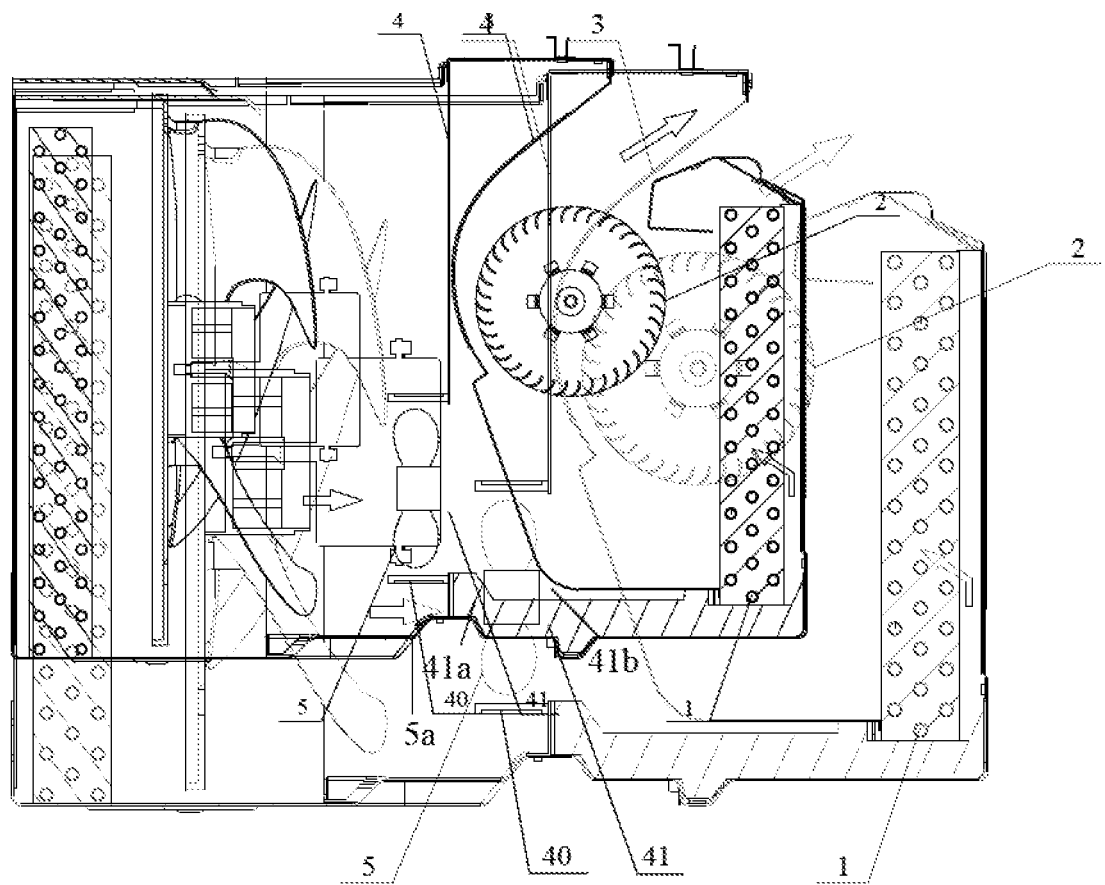
FIG. 4 is a cross-sectional view of the fresh air dehumidification device along line B-B of FIG. 2.
Figure 5:
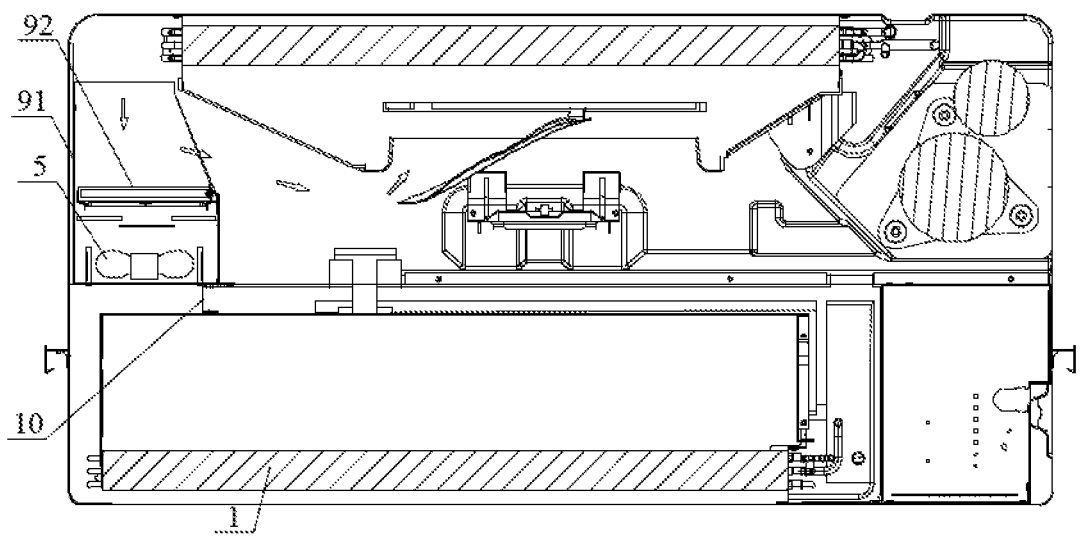
FIG. 5 is similar to FIG. 3, but shown the air door in its close state.
Figure 6:
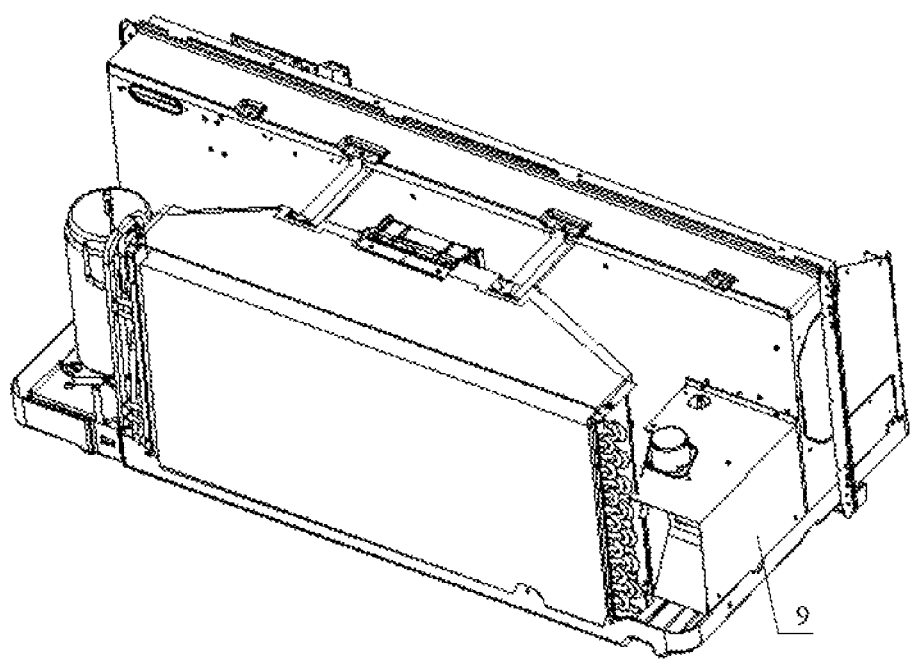
FIG. 6 is a schematic view of the fresh air dehumidification device of FIG. 2, shown a member installed thereon.
Figure 7:
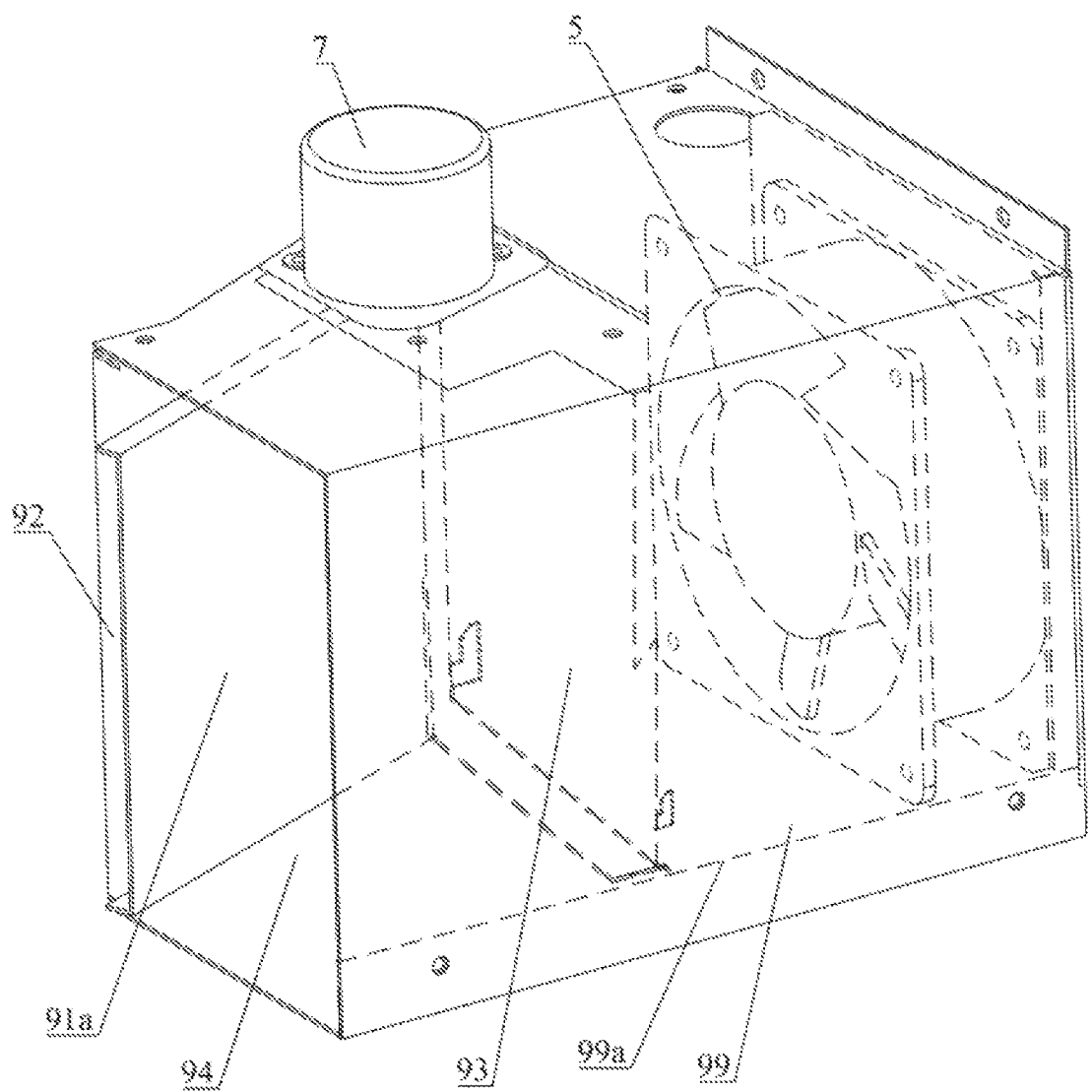
FIG. 7 is a perspective, schematic view of the member of the fresh air dehumidification device of FIG. 2.
Figure 8:
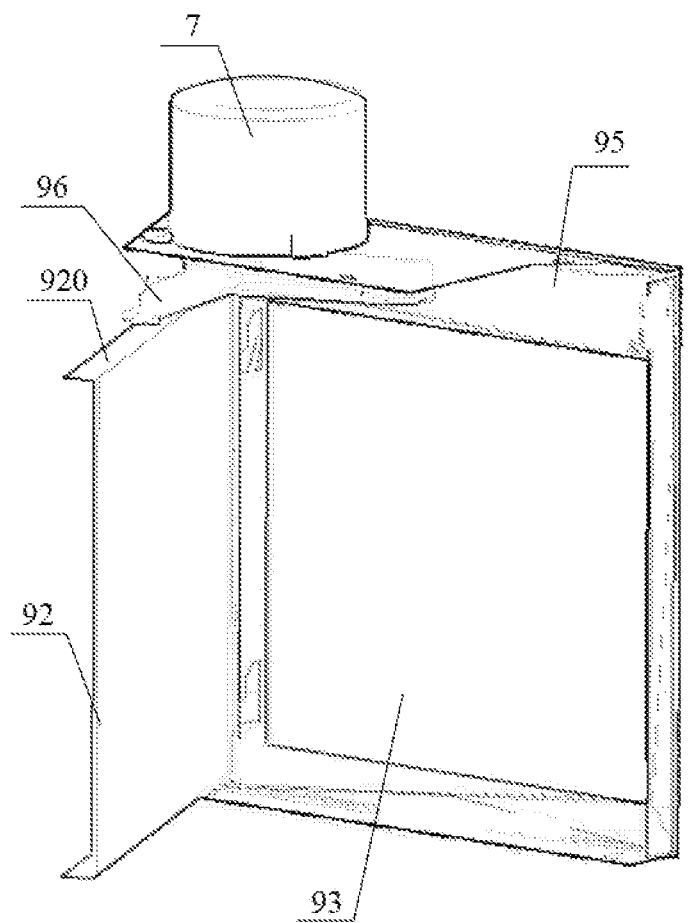
FIG. 8 is an assembly schematic view of a driving device, an air door, a frame and a swinging rod of the fresh air dehumidification device of FIG. 2, shown an air door gate in an open state.
Figure 9:
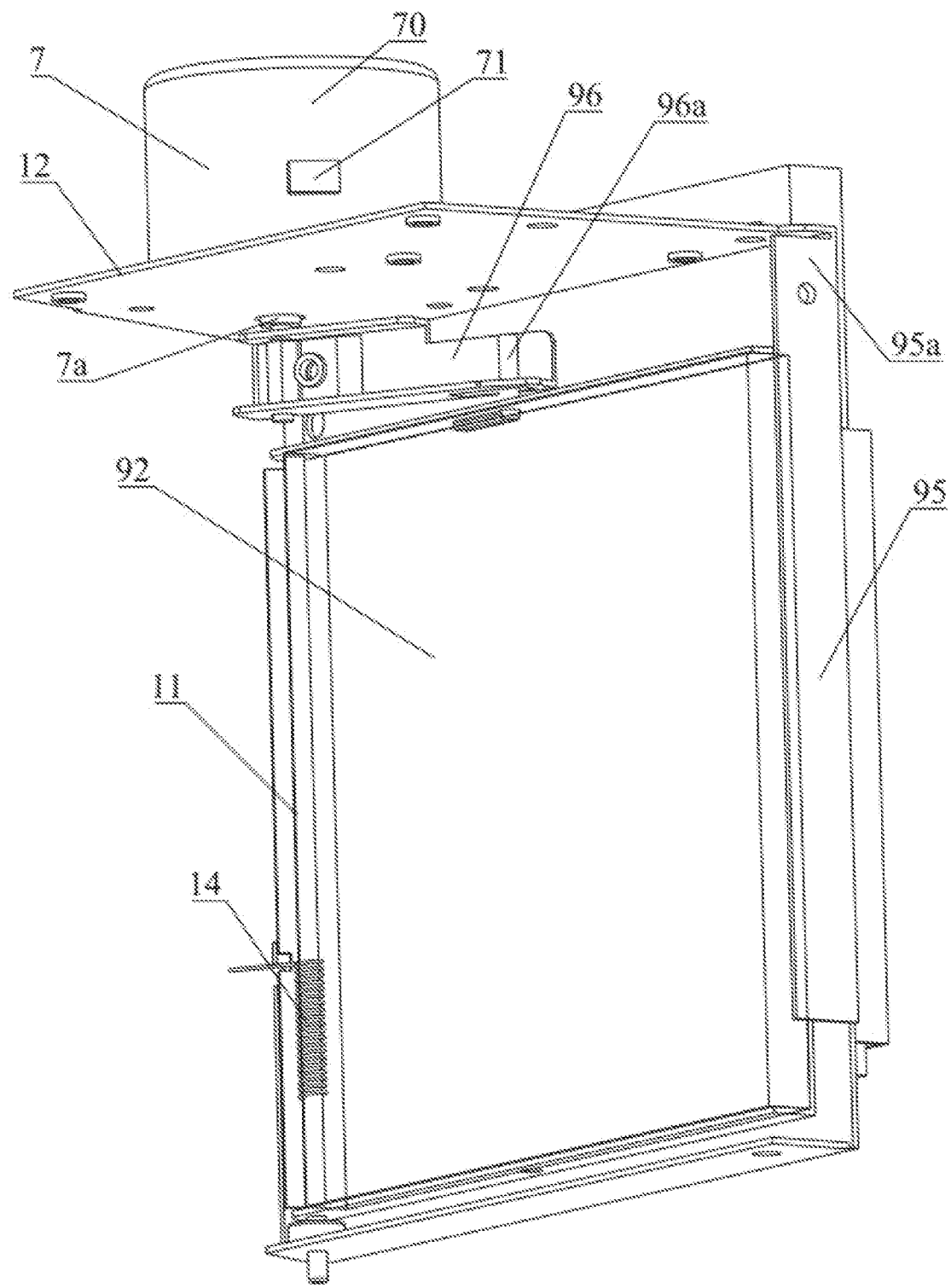
FIG. 9 is similar to FIG. 8, but shown the air door gate in a close state.
Figure 10:
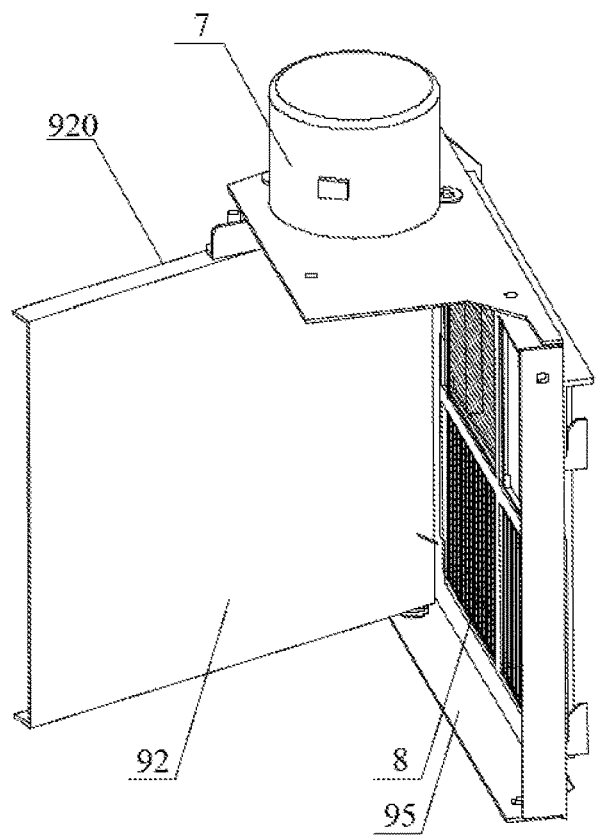
FIG. 10 is a schematic view of the member, with an air filtering device therein, of the fresh air dehumidification device of FIG. 2.
Figure 11:
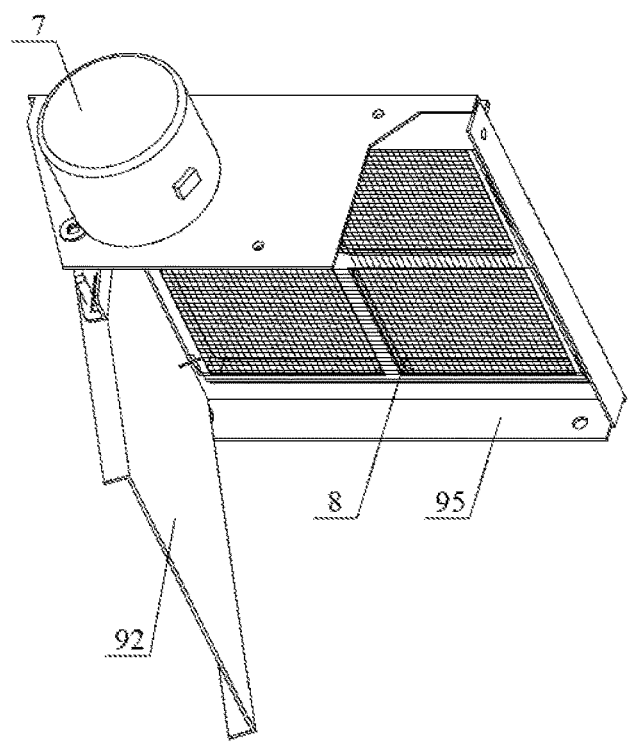
FIG. 11 is similar to FIG. 10, but shown from a top view.
Figure 12:
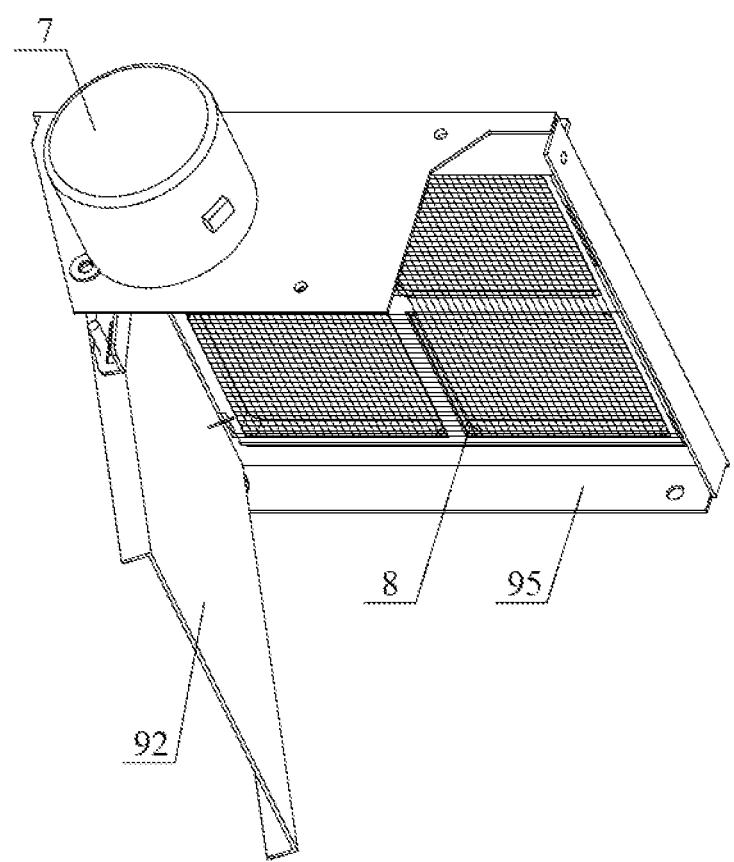
FIG. 12 is similar to FIG. 10, but shown from a third side view.
Figure 13:
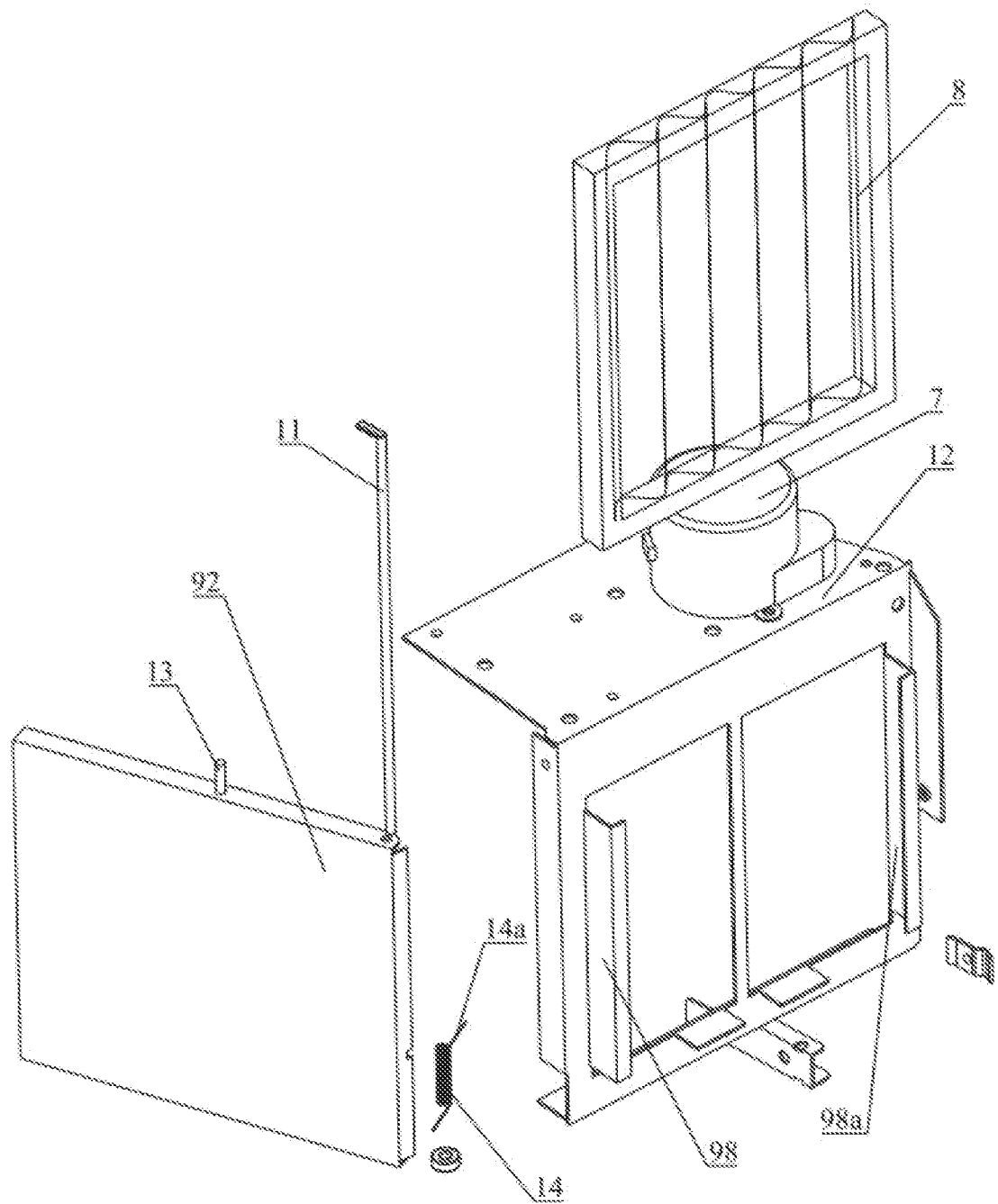
FIG. 13 is an exploded, schematic view of the member, with the air filtering device therein, of the fresh air dehumidification device of FIG. 2.
Figure 14:
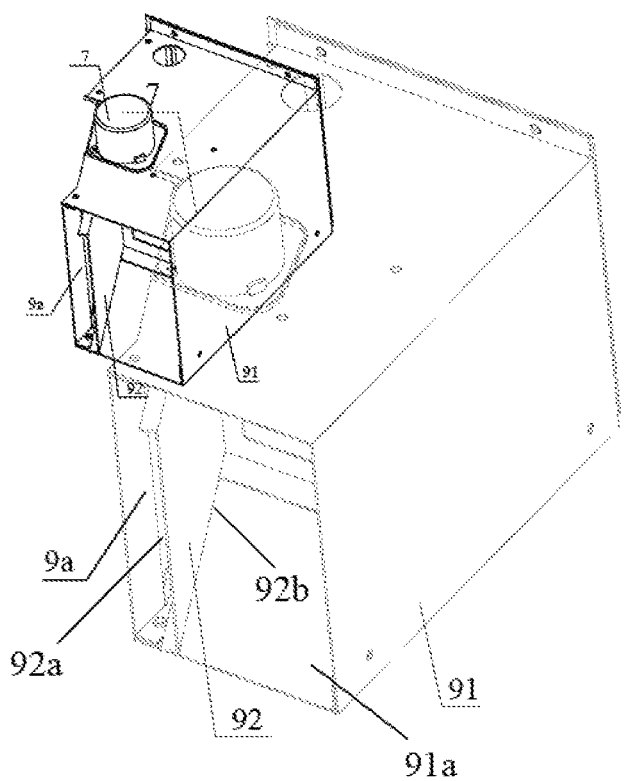
FIG. 14 is an assembly schematic view of the member of the fresh air dehumidification device of FIG. 2.
Figure 15:
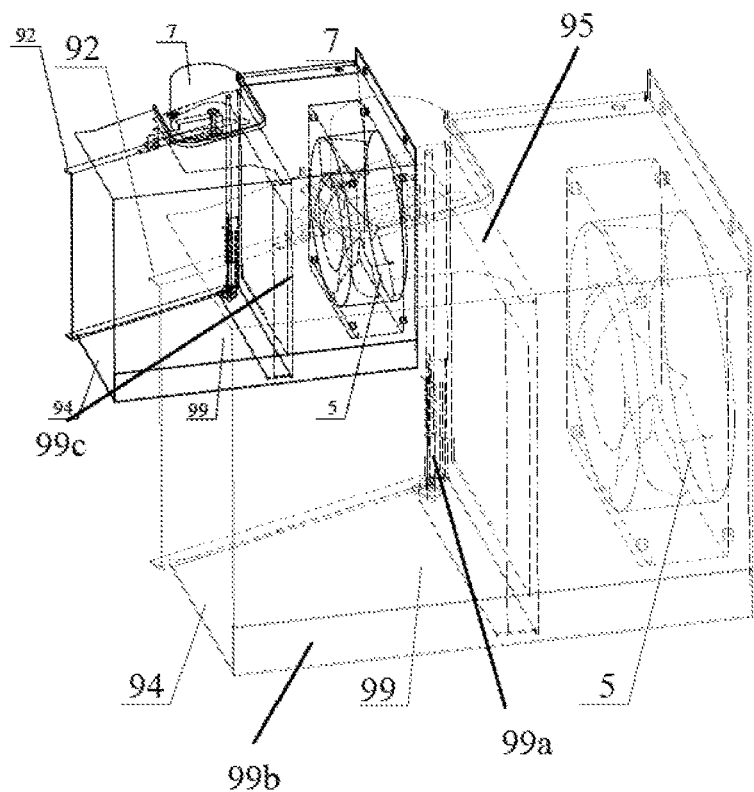
FIG. 15 is similar to FIG. 14, but some structure of the member shown in dotted line.
Figure 16:
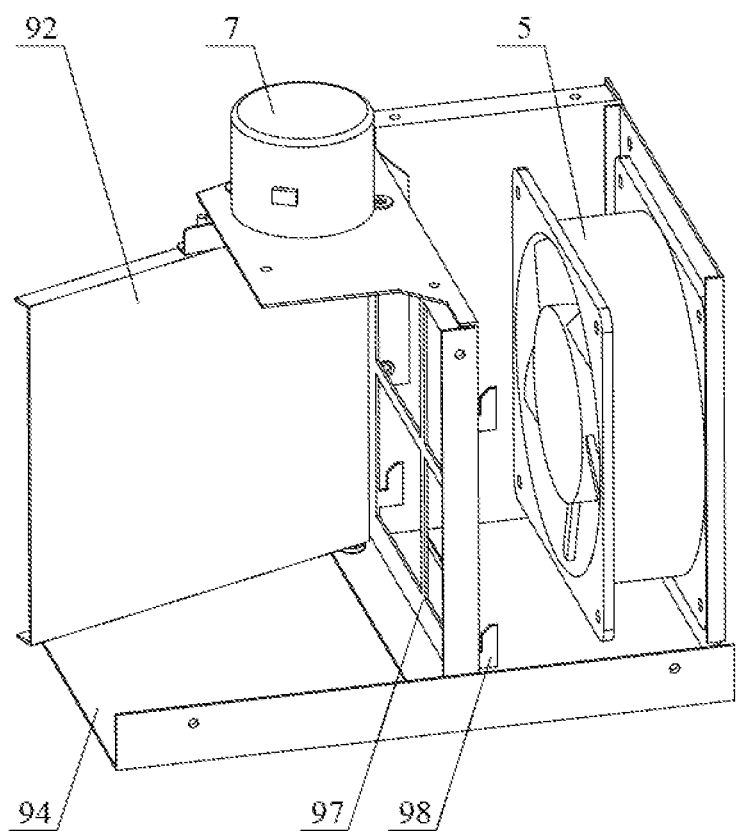
FIG. 16 is similar to FIG. 14, but shown the air filtering device and a shielding thereon removed.

Specifically, the shielding 91 includes a bottom plate 94 and a channel plate 99, with an L-shaped configuration and a bottom portion 99a thereof connecting with the bottom plate 94. The door frame 95 is installed on the bottom plate 94 and the channel plate 99. A bottom end of a side plate 99b of the channel plate 99 is connected with the bottom plate 94 and an upper cover 99c thereof is positioned above the bottom plate 94. Of course, according to actual installation condition, the shape of the shielding 91 is not limited to the above situation. When opening the air door 92, an end 92a of the air door 92 is rotated toward a direction far away from the side plate 99b of the channel plate 99, preferably, when the air door 92 is opened that an air intake duct of an outdoor fan is blocked by it. Referring to FIG. 3, when the air door 92 is opened, the fresh air is directed to the air exhausting device 5. Referring to FIG. 5, when the air door 92 is closed, the air inlet 6a of the air supply channel 6 is communicated with the air intake duct of the outdoor fan. That is, the fresh air flows to the outdoor fan without needing the extra air exhausting device 5, thereby increasing the air volume in the outdoor.

Furthermore, the air door 92 is received in the shielding 91, and when the air door 92 is in an open state, the end 92a of the air door 92 is rotated away from the fan 5 and a side portion 92b of the air door 92 is flushed with the main air intake 91a of the shielding 91. Because during the air door 92 in its open state, the whole air door 92 is still inside the shielding 91 so that the situation of external material interference and damage to the air door 92 can be effectively avoided, which can effectively improve the span-life of the air door 92. In order to improve the usage security, preferably, the member 9 further includes a limiting portion 9a for limiting the air door 92, and the switch 71 controls the servo motor 70 to stop working when the limiting portion 9a is resisted against the air door 92. The limiting portion 9a is provided to prevent the air door 92 from colliding with the shielding 91 when the air door 92 moves to its limit position, thereby the span-life of the air door 92 can be further improve.

A packaged terminal air conditioner according to an exemplary embodiment of the present disclosure includes the fresh air dehumidification device which is described above.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A fresh air dehumidification device comprising a cross-flow fan, a main evaporator, an air supply channel communicated with the cross-flow fan via the main evaporator, and a fan formed in the air supply channel and communicated with the main evaporator via the air supply channel for directly supplying outdoor air to the main evaporator; and wherein an air inlet of the air supply channel is connected to outdoor air and an air outlet of the air supply channel is formed on a first air intake of the main evaporator; and wherein when requiring to supply air from an outdoor space into an indoor space, fresh air from the outdoor space passes through the air supply channel via the fan and then flows into the main evaporator to be dehumidified, and finally flows into the indoor space via the cross-flow fan; and wherein the fresh air dehumidification device further comprises an air duct plate, which is a sealing plate, and a middle partition comprising an installing hole, and a pair of supporting portions respectively installed in an upper portion and an opposite lower portion of the installing hole to respectively connect with two ends of the fan; and wherein the fresh air dehumidification device further comprises a member set on a second air intake of the fan and comprising at least one air filtering device installed in the air supply channel for filtering the outdoor air, and a shielding, an air door and a hysteretic motor for driving the air door to open and close, the fan is received in the shielding and a main air intake of the shielding is the air inlet of the air supply channel and directly opposite to the fan.

2. The fresh air dehumidification device as claimed in claim 1, wherein the member further comprises a door frame on which both the air door and the air filtering device are installed, the air door rototably connected with the door frame, along a movement direction of air flow, the air door located at the back of the air filtering device and the door frame installed in the shielding.

3. The fresh air dehumidification device as claimed in claim 2, wherein a rotating shaft is arranged on a side of the air door through which the air door is connected with the door frame, and the air door can be driven by the driving device to rotate around the rotating shaft to open and close.

4. The fresh air dehumidification device as claimed in claim 2, wherein member further comprises a supporting plate formed on a top end of the door frame and a swinging rod connected to the air door, and the driving device is a hysteretic-motor fixed on the upper of the supporting plate for driving the swinging rod to move, with a main shaft of the hysteretic-motor extending downward through the supporting plate to connect with the swinging rod.

5. The fresh air dehumidification device as claimed in claim 4, wherein a convex shaft is formed on the air door and parallel to the rotating shaft, one end of the swinging rod is connected with the main shaft of the hysteretic-motor and the other end of the swinging rod comprises a slot so that the swinging rod is connected with the convex shaft through the slot for providing a freedom degree of rotatably driving the air door.

6. The fresh air dehumidification device as claimed in claim 2, wherein a torsion spring is connected between the air door and the door frame to automatically close and reset the air door after it is opened, and sleeved around the rotating shaft, a pair of torsion beams formed at two opposite ends of the torsion spring is respectively jacked on a rim of the air door and the door frame so that the air door has a movement trend to automatically close towards a side of the door frame.

7. The fresh air dehumidification device as claimed in claim 6, wherein an elastic cushion pad is formed on both inner and outer edges of the rim of the air door.

8. The fresh air dehumidification device as claimed in claim 1, wherein the air filtering device is a filter grill and the door frame comprises a filter frame for installing the filter grill.

9. The fresh air dehumidification device as claimed in claim 8, wherein the filter frame is detachably connected with the filter grill, and the filter frame comprises a supporting post comprising a recess for clamping with the filter grill.

10. The fresh air dehumidification device as claimed in claim 1, wherein the shielding comprises a bottom plate and a channel plate, with a L-shaped configuration and a bottom portion thereof connecting with a the bottom plate, the door frame is installed on the bottom plate and the channel plate; a bottom end of a side plate of the channel plate connected with the bottom plate and an upper cover positioned above the bottom plate, when opening the air door, an end of the air door is rotated towards a direction far away from the side plate of the channel plate so that an air intake duct of an outdoor fan is blocked by the air door; while when closing the air door, the air inlet of the air supply channel is communicated with the air intake duct of the outdoor fan.

11. The fresh air dehumidification device as claimed in claim 1, wherein the air door is received in the shielding, when the air door is in an open state, the end of the air door is rotated away from the fan and a side portion of the air door is flushed with the main air intake of the shielding.

12. The fresh air dehumidification device as claimed in claim 1, wherein the driving device comprises a servo motor and a switch for controlling activation of the servo motor, the member further comprises a limiting portion for limiting the position of the air door, the switch controls the servo motor to stop working when the limiting portion is resisted against the air door.

13. A packaged terminal air conditioner comprising a fresh air dehumidification device, the fresh air dehumidification device comprising: a cross-flow fan, a main evaporator, an air supply channel communicated with the cross-flow fan via the main evaporator, a fan formed in the air supply channel and communicated with the main evaporator via the air supply channel for directly supplying outdoor air to the main evaporator, a member set on a second air intake of the fan, an air duct plate and a middle partition comprising an installing hole, and a pair of supporting portions respectively installed in an upper portion and an opposite lower portion of the installing hole to respectively connect with two ends of the fan; and wherein the air duct plate is a sealing plate, an air inlet of the air supply channel is connected to the outdoor air and an air outlet of the air supply channel is formed on a first air intake of the main evaporator; and wherein when requiring to supply air from an outdoor space into an indoor space, fresh air from the outdoor space passes through the air supply channel via the fan and then flows into the main evaporator to be dehumidified, and finally flows into the indoor space via the cross-flow fan; and wherein the fresh air dehumidification device further comprises at least one air filtering device installed in the air supply channel for filtering the outdoor air, and a shielding, an air door and a hysteretic motor for driving the air door to open and close, the fan is received in the shielding and a main air intake of the shielding is the air inlet of the air supply channel and directly opposite to the fan.

14. The packaged terminal air conditioner as claimed in claim 13, wherein the member comprises at least one of an air filtering device installed in the air supply channel for filtering the outdoor air, a door frame, and a shielding, an air door and a hysteretic-motor for driving the air door to open and close, the fan is received in the shielding and a main air intake of the shielding is the air inlet of the air supply channel and directly opposite to the fan; the air door rotatably connected with the door frame, along a movement direction of air flow, the air door located at the back of the air filtering device and the door frame installed in the shielding; the door frame on which both the air door and the air filtering device are installed, and a rotating shaft is arranged on a side of the air door through which the air door is connected with the door frame, the air door is driven by the hysteretic-motor to rotate around the rotation shaft to open and close.

15. The packaged terminal air conditioner as claimed in claim 13, wherein the shielding comprises a bottom plate and a channel plate, with a L-shaped configuration and a bottom portion thereof connecting with the bottom plate, the door frame installed on the bottom plate and the channel plate; a bottom end of a side plate of the channel plate connected with the bottom plate and an upper cover positioned above the bottom plate, when opening the air door, an end of the air door is rotated towards a direction far away from the side plate of the channel plate so that an air intake duct of an outdoor fan is blocked by the air door; while when closing the air door, the air inlet of the air supply channel is communicated with the air intake duct of the outdoor fan; the air door is received in the shielding; and when the air door is in an open state, the end of the air door is rotated away from the fan and a side portion of the air door is flushed with the main air intake of the shielding.

* * * * *